United States Patent [19]
Joseph et al.

[11] Patent Number: 5,646,352
[45] Date of Patent: Jul. 8, 1997

[54] METHOD AND APPARATUS FOR MEASURING A PARAMETER OF A MULTIPHASE FLOW

[76] Inventors: Daniel D. Joseph, 1920 S. First St., Apt. 2302, Minneapolis, Minn. 55454; Runyuan Bai, 701 University Ave. SE., Apt. 203, Minneapolis, Minn. 55414

[21] Appl. No.: 570,628

[22] Filed: Dec. 11, 1995

[51] Int. Cl.$^6$ .................................................. G01L 7/00
[52] U.S. Cl. ................................................ 73/756; 285/197
[58] Field of Search ........................... 73/756, 715, 730, 73/861.04; 285/197, 93

[56] References Cited

U.S. PATENT DOCUMENTS

| | | | |
|---|---|---|---|
| 4,040,289 | 8/1977 | Clark et al. | 73/46 |
| 4,118,990 | 10/1978 | Van Zeggelaar | 73/756 |
| 4,832,376 | 5/1989 | Sugao | 285/197 |
| 4,840,068 | 6/1989 | Mayhew, Jr. | 73/730 |
| 5,022,271 | 6/1991 | Hannon, Jr. | 73/730 |
| 5,312,137 | 5/1994 | Nee | 285/14 |
| 5,330,720 | 7/1994 | Sorbo et al. | 422/98 |
| 5,347,868 | 9/1994 | Shigesada et al. | 73/715 |

*Primary Examiner*—Richard Chilcot
*Assistant Examiner*—Harshad Patel
*Attorney, Agent, or Firm*—Patterson & Keough, P.A.

[57] ABSTRACT

The present invention comprises method of measuring a parameter of a multiphase flow of a fluid and apparatus therefore. The apparatus comprises a buffer chamber apparatus that is operably fluidly coupled to a pipe bearing a fluid comprised of components of different densities. The buffer chamber apparatus has structure that defines a substantially fluid tight chamber that is in flow communication with the fluid borne in the pipe. One or more ports are defined in the chamber structure whereby the fluid in the chamber may be selectively accessed for sensing a parameter of the fluid. The fluid in the chamber resides in a substantially stable state promoting the separation of the different density components of the fluid.

25 Claims, 4 Drawing Sheets

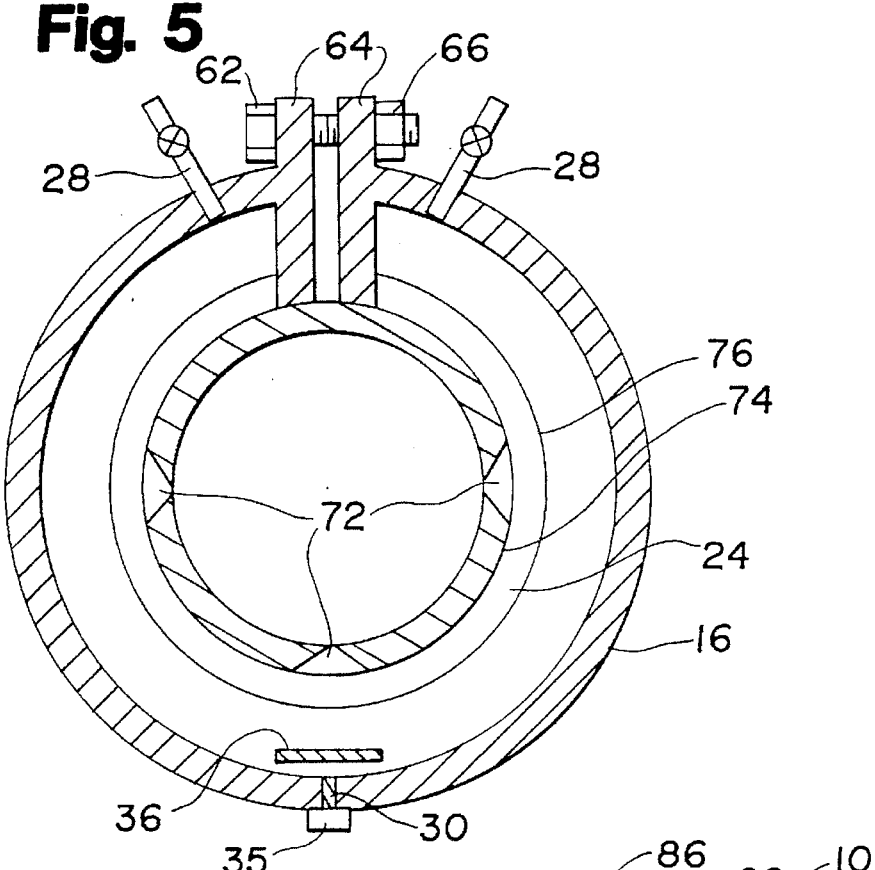
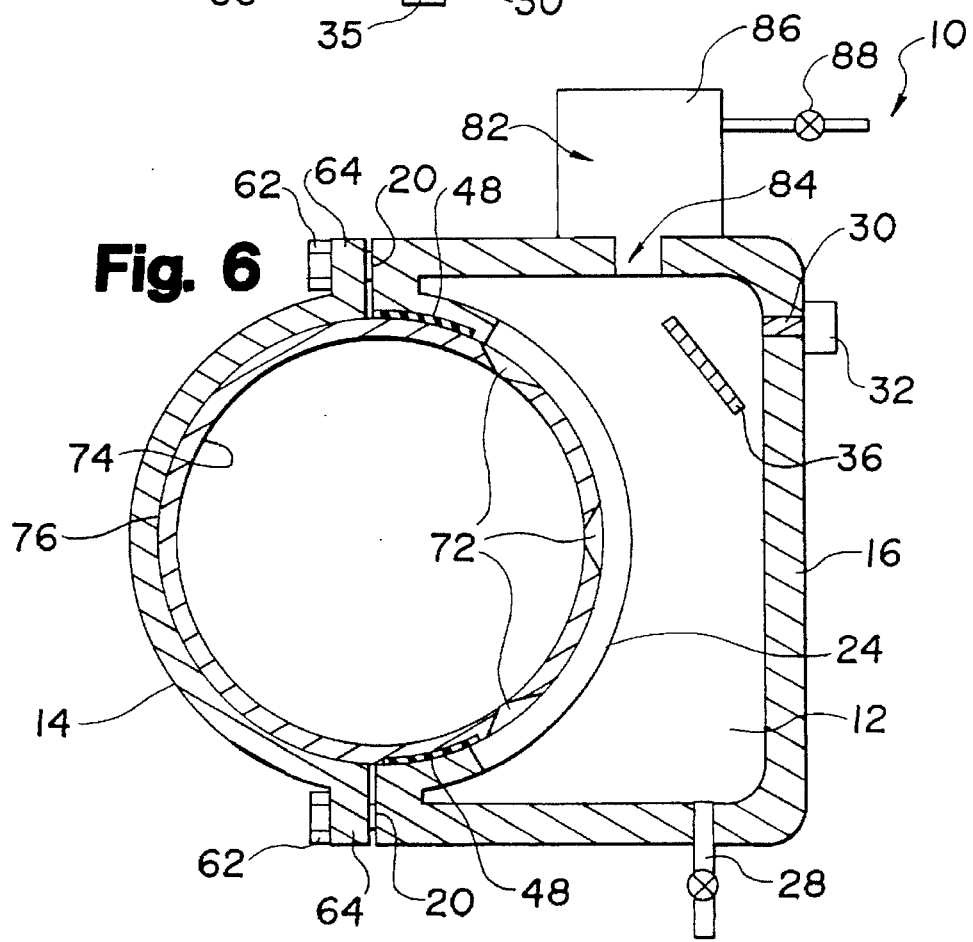

METHOD AND APPARATUS FOR MEASURING A PARAMETER OF A MULTIPHASE FLOW

BACKGROUND OF THE INVENTION

1. Field of the Invention

The present invention relates generally to measuring a parameter of a multiphase flow in a pipe. More particularly, the present invention relates to buffer chamber assemblies which are coupled to a pipe proximate a pipe tap. The buffer chamber assembly serves as a means to sense parameters of the fluid in the pipe, to sample the fluid in the pipe, and to introduce fluid to the flow in the pipe, while resisting the clogging of the pipe tap.

2. Description of the Prior Art

Pipe taps, particularly pipe taps that are coupled to parameter measuring devices, such as pressure measuring devices, are typically ineffective when used on pipes carrying fluids which tend to clog. The clogging that attends the flow of some fluids that are typically transported in pipes rather quickly partially or fully occludes the tap opening, thereby affecting the accuracy of the parameter measurement. The tap in the pipe may be remotely located and clearing of a clogged condition may pose considerable problems, not the least of which is the potential need to shut down flow in the pipe during the cleaning operation.

U.S. Pat. No. 5,312,137 by Nee discloses a safety shield for capturing corrosive fluids escaping from a joint in a piping system. The safety shield includes an aperture to encircle a pipe and an outlet. Devices may be included which measure the conditions within the shield.

U.S. Pat. No. 4,040,289 by Clark discloses a method and an arrangement for air testing of sewer lateral connections. The tester is pressurized with air over the lateral connection location and the air pressure monitored. If the tester holds pressure, the connection is deemed leakage proof.

U.S. Pat. No. 5,330,720 by Sorbo discloses a system for detecting gaseous emissions from a mechanical coupling. The housing comprises a semi-permeable material which allows the gases to escape while preventing foreign matter from entering the housing.

U.S. Pat. No. 5,022,271 by Hannon, Jr., discloses a pressure sensing device for pipes carrying corrosive or abrasive fluids. The device measures pressure in the pipe by the movement of a thin metal wall incorporated into the pipe. The thin metal wall includes pleats or folds which allows the wall to move inwardly or outwardly in response to changes in pressure.

U.S. Pat. No. 4,840,068 by Mayhew, Jr. discloses a pressure sensor assembly which measures pressure by the movement of a diaphragm included in a pipe wall. A chamber upon which the pressure sensor is mounted contains a pressure sensing fluid kept separate from fluid in the pipe by the flexible diaphragm. The flexible diaphragm flexes outward or inward causing the sensing fluid to pressurize of depressurize. There is no mixing of the pipe fluid and the sensing fluid.

U.S. Pat. No. 5,347,868 by Shigesada discloses a pressure gauge designed for use in measuring the pressure of thixotropic (colloidal) liquids. The object of the invention is to prevent aggregation stagnation of the fluid by controlling the stagnation of a magnetic coating liquid in the vicinity of a pressure sensor. Aggregation of fluid near the pressure gauge is subsequently reduced.

There is a need for a pipe tap which resists clogging and minimizes the corrosive effect on parameter sensors from corrosive fluids being transported in the pipe. The pipe tap should be inexpensive to manufacture and highly effective. Such a buffer chamber assembly must reduce clogging near a parameter sensor, thereby making more accurate readings as to the various parameters of the fluid. Additionally, such a buffer chamber assembly should be simple to use, especially when readings must be taken in the field under potentially hostile environmental conditions. Such a buffer chamber assembly should also utilize existing tools for mounting on pipes rather than requiring specialized equipment.

SUMMARY OF THE INVENTION

In keeping with the principles of the present invention, the objects are accomplished with the unique configuration of a buffer chamber operatively connected to one or more countersunk pipe taps. The combination of those elements in the present invention results in a device which is easy to install and remove and is simple and inexpensive to manufacture.

The buffer chamber assembly is designed to cause the separation of fluids passing through a pipe. Separation is accomplished by passing the fluids through pipe taps in the pipe wall and into a buffer chamber. Separation then occurs as the denser fluid sinks to the bottom of the buffer chamber while fluid or fluids of lower density move toward the top of the chamber.

Separation of fluids is critical when one or more of the fluids has the potential for clogging in the vicinity of the pressure measuring device used to measure pressure of the fluid. Clogging, or the accumulation of material with a different viscosity than the bulk of the fluid, may cause a pressure differential across the clogged material. That pressure differential would then result in inaccurate pressure readings from the pressure measuring device.

The present invention, by causing separation of the fluids carried in a pipe, causes only a selected fluid or fluids to come in contact with the pressure measuring device. Preferentially, those fluids are less likely to clog. For instance, in a pipe carrying oil and water, the buffer chamber assembly could be used to separate the oil from the water. Because oil generally has a lower density than water, oil will rise to the top of the buffer chamber while water will sink to the bottom. Because water has less clogging potential than oil, in this instance a pressure sensor port, which allows communication between the buffer chamber and the pressure measuring device, should be located near the bottom of the buffer chamber. Consequently, there is a reduced likelihood that clogging will occur in the vicinity of the pressure measuring device. Additionally, since there is effectively no flow in the buffer chamber after the initial fluid from the pipe has flooded the buffer chamber, one of the separated fluids in the chamber could be drawn off through a port, leaving only the more benign fluid in the buffer chamber.

Similarly, another advantage of the present invention is the separation of fluids when one or more of the fluids has corrosive properties which would be deleterious to the pressure measuring device. In that instance, separation of the fluids coupled with an appropriate placement of the parameter tap in the buffer chamber would allow only the less caustic fluid or fluids to come in contact with the parameter measuring device.

A further advantage of the present invention is that by including a port in the buffer chamber, fluids from the pipe flow may be sampled by withdrawing a sample through the port and additives that affect the flow as desired may be introduced to the flow in the pipe by injection through the same port.

The present invention comprises a buffer chamber apparatus that is operably fluidly coupled to a pipe bearing a fluid of different densities. The buffer chamber apparatus has structure that defines a substantially fluid tight chamber that is in flow communication with the fluid borne in the pipe. One or more ports are defined in the chamber structure whereby the fluids in the chamber may be selectively accessed for sensing a parameter of the fluid. The fluid in the chamber resides in a substantially stable state promoting the separation of the different density fluids by gravity.

BRIEF DESCRIPTION OF THE DRAWINGS

FIG. 5 is a sectional view of a third preferred embodiment of the buffer chamber assembly comprising a single, circular chamber for measuring the average pressure in a cross section of a pipeline.

FIG. 6 is a sectional view of a fourth preferred embodiment of the buffer chamber assembly comprising a single chamber and a flush or injection system.

DESCRIPTION OF THE PREFERRED EMBODIMENT

For the purpose of describing the features of the present invention, the buffer chamber assembly is discussed in operative connection to a pipe. The pipe is generally used for the transport of fluids, such as oil and water in liquid form, although the term fluid is not intended to be limited only to liquids.

To measure a fluid parameter, such as the pressure of the fluid, at a given location on a pipe, pipe taps are made in the wall of the pipe. These pipe taps allow fluid to escape. If the fluid flows into a fixed volume, the fluid retains the approximate parameter of the fluid travelling in the pipe that is sought to be sensed. When measured, the parameter in the fixed volume can be calibrated to give an accurate reading as to the parameter of the fluid flowing in the pipeline.

Referring to the Figures, wherein like numerals indicate like components throughout, the buffer chamber assembly of the present invention is shown generally at 10. With regard to FIGS. 1-3, the buffer chamber assembly 10 has two major components; a chamber 12 and a retaining strap 14. The buffer chamber assembly 10 is depicted associated with a pipe 15 used to transport fluids.

The chamber 12 is preferably composed of a non-permeable, corrosion resistant material which is able to withstand the pressures of the fluid that is being transported in the pipe 15, such as aluminum or steel. In certain applications, the chamber 12 may be formed of a thermoplastic of polyvinyl chloride material where the pressures are relatively low and to take advantage of the corrosion resistance properties of such material.

Figure 1:
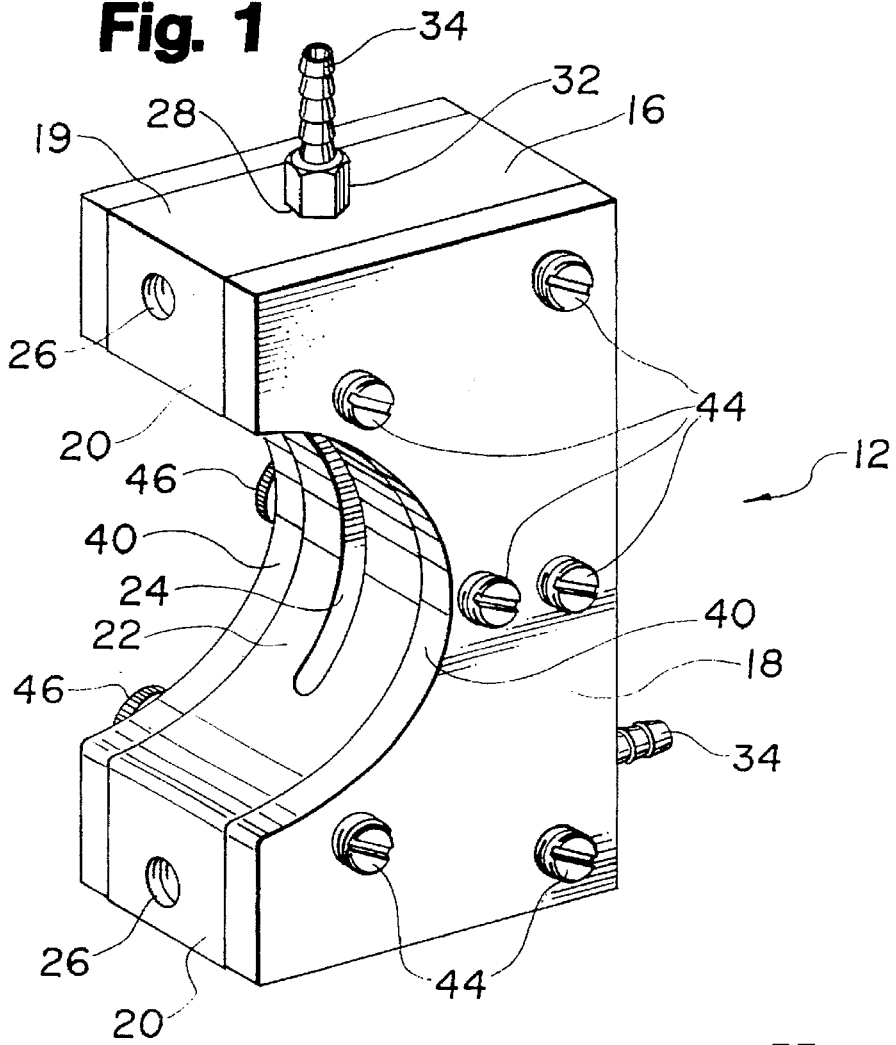
FIG. 1 is a perspective view of the chamber of the buffer chamber assembly.

Generally, the chamber 12 may have a number of different shapes; the chamber 12 depicted in FIG. 1 being generally a cube. In this embodiment, the retaining strap 14 compressively couples the chamber 12 to the pipe 15. The chamber 12 comprises a chamber body 16 and two opposed sides 18. The chamber body 16 comprises a generally u-shaped frame 19. The frame 19 has two flat coplanar mounting panels 20 at the two ends of the u-shaped frame 19. The mounting panels 20 each include a threaded hole 26 defined therein.

A curved body panel 22 connects the two mounting panels 20. The curved body panel 22 is generally a segment of a half cylinder that must be fit to the outside circumference of the pipe 15. Accordingly, the outside surface of the curved body panel 22 has radius that is very slightly greater than the radius of the particular pipe 15 that the chamber 12 is intended to be mated to. The curved body panel 22 presents a sealing face for establishing a sealing engagement with the pipe 15. A chamber port 24 is defined in the curved body panel 22. The chamber port 24 is preferably a generally elongated orifice.

Figure 3:
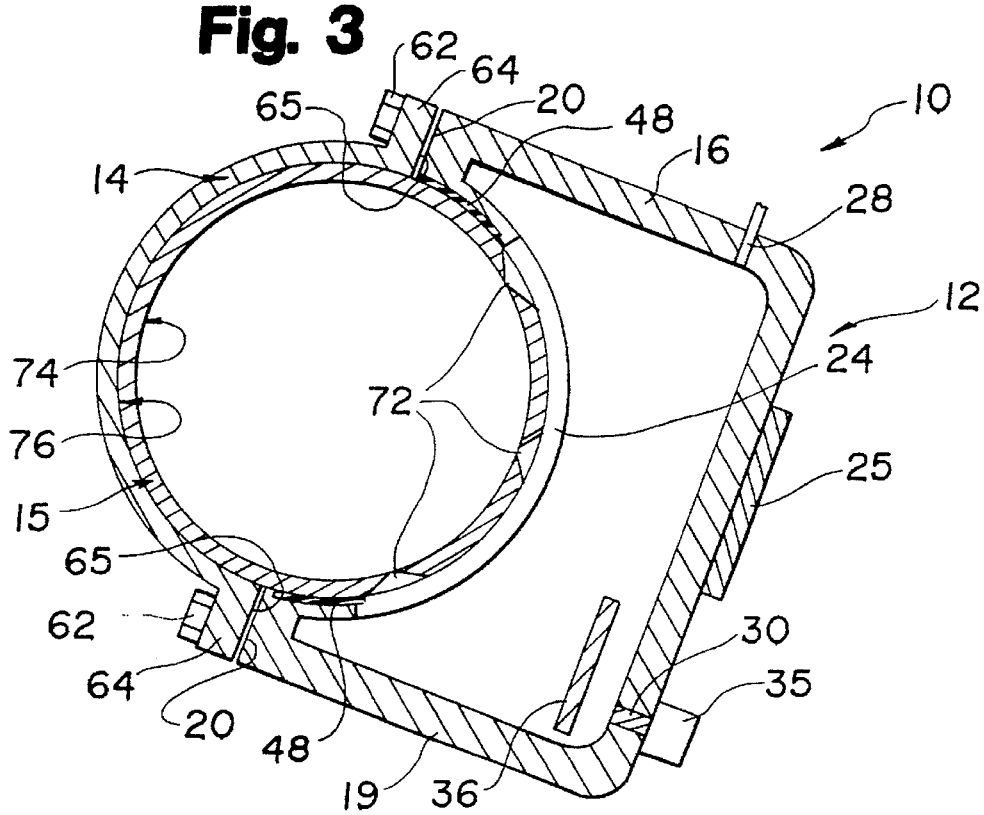
FIG. 3 is a sectional side elevational view of a preferred embodiment of the buffer chamber assembly comprising a single chamber.

Referring to FIG. 3, heater 25 may be mounted to the body 16. The heater 25 is useful to transfer heat through the structure of the body 16 to heat the fluid in the chamber 12 as desired. The heater 25 is typically an electrical heater and is connected to an electrical power source by electrical leads (not shown).

Valve port 28 and sensor port 30 are defined in the body 16. Threaded bushings (not shown) are typically utilized in conjunction with the ports 28, 30. Such bushings are threaded into the ports 28, 30 and project therefrom. Nuts 32 produce fluid-tight pressure fits for the retention of pipe fittings 34 to the valve port 28 and sensor port 30.

The valve port 28 and the sensor port 30 are typically displaced from one another in elevation as the chamber 12 is mounted on the pipe 15. As depicted, the valve port 28 is elevated above the sensor port 30. The valve port 28 is positioned to draw off air trapped within the chamber 12 or to draw off the lighter of two separable fluids that are contained within the chamber 12. The valve port 28 may be sealed off after removal of fluid as desired. The heavier of the two separable fluids will act upon the sensor port 30.

Figure 2:
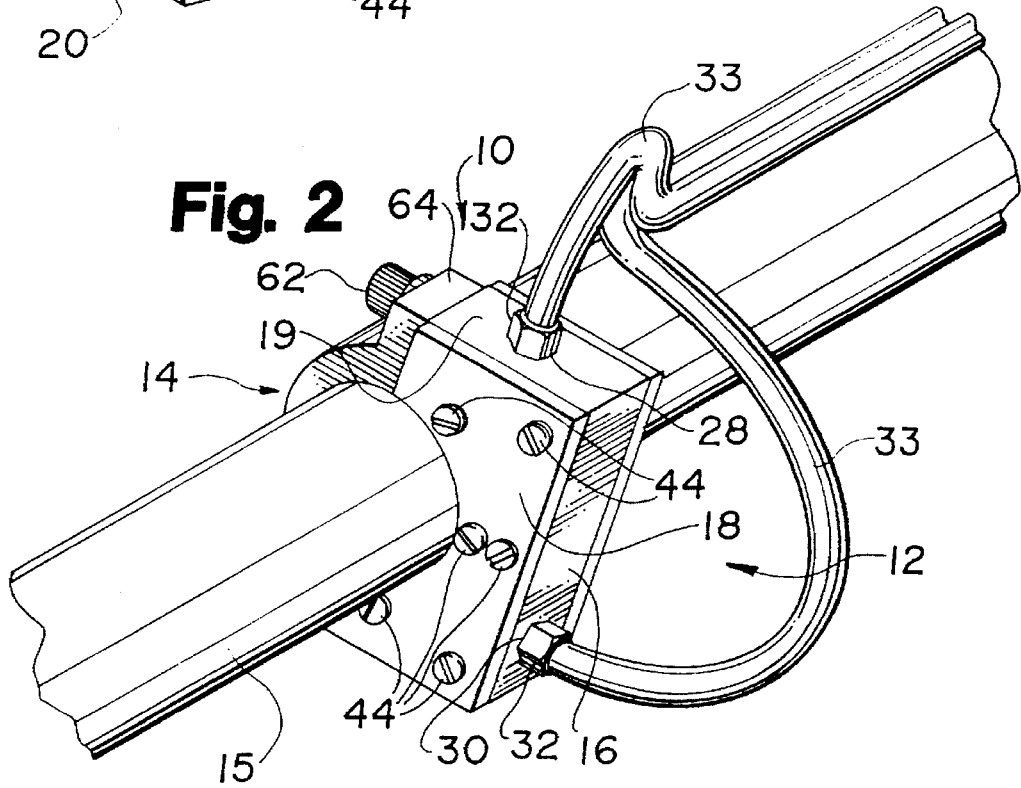
FIG. 2 is a perspective view of the buffer chamber assembly mounted on a pipe.

Parameter sensing of the fluid in the chamber 12 may be done in a number of ways. As depicted in FIG. 2, lines 33, connected to the valve port 28 and sensor port 30 may be further connected to a manometer, pressure gauge, or transducer. As depicted in FIG. 3, a sensor device 35 is attached to the outer surface of the chamber 12 and is located proximate to the sensor port 30. The sensor device 35 may sense such fluid parameters as the pressure or temperature of the fluid in the chamber 12. A protecting barrier 36 is attached to the inside of the chamber 12 and is located proximate to the sensor port 30.

The chamber sides 18 are generally rectangular with an edge comprising a semi-circular curved section 40 that generally matches the curvature of the curved body panel 22. The chamber sides 18 are held clamped to the side margins of the chamber body 16 by plurality of pass through bolts 44. The plurality of bolts 44 are disposed within corresponding bores (not shown) in each of the chamber sides 18 that are in registry when the sides 18 are disposed on the chamber body 16. The bolts 44 are passed through the bores in a first chamber side 18, through the interior of the chamber 12, and through the corresponding bore in the second chamber side 18 with the threaded end thereof projecting beyond the second chamber side 18. The ends of the bolts 44 are retained by burl nuts 46. A gasket material is provided between the sides 18 and the body 16 resulting in a pressure seal when the burl nuts 46 are tightened down. The gasket material is of a type compatible with the fluids introduced into the chamber 12 and having properties which allow adequate pressure differential to be maintained without failure of the gasket material.

A gasket 48, as depicted in FIG. 3, is disposed on the outer surface of the curved section 22 and is held in compressive engagement between the buffer chamber assembly 10 and the pipe 15. The gasket 48 substantially surrounds the chamber port 24 and has a slot (not shown) defined therein that is in registry with the chamber port 24 so that the gasket 48 does not cover the chamber port 24. The material that is used to form the gasket 48 is selected much as the material for the gasket material that is provided between the sides 18 and the body 16, bearing in mind the pressure requirements and the properties of the fluid that is being transported in the pipe 15.

The second major part of the buffer chamber assembly 10 is the retaining strap 14. The retaining strap 14 is preferably composed of a strong but flexible material such as steel. The retaining strap 14 is formed in a generally semicircular shape and, when mated to the chamber 12 defines a circular opening therein that has a diameter that is slightly greater than the outside diameter of the pipe 15 to which the particular buffer chamber assembly 10 is to be mated. The retaining strap 14 has flanges 64 formed at the two ends thereof. Each of the flanges 64 has a face 65 that is adapted to mate with the mounting panels 20. Each flange 64 has a bore (not shown) defined therein that is in registry with the threaded hole 26 defined in the opposing mounting panel 20. The retaining strap 14 is compressively coupled to the chamber 12 and to the pipe 15 by the bolts 62 being threaded into the threaded holes 26. By threading the bolts 62 into the holes 26, the gasket 48 is compressed between the pipe 15 and the outer surface of the curved section 22, creating a fluid-tight seal between the buffer chamber assembly 10 and the pipe 15.

The buffer chamber assembly 10 is operatively connected to a pipe 15. The pipe 15 has an inner surface 74 and an outer surface 76. Taps 72 are defined extending through the wall of the pipe 15, extending from the inner surface 74 to the outer surface 76. The taps 72 generally taper in diameter from a larger diameter at the outer surface 76 to a smaller diameter at the inner surface 74 as distinct from the more usual bores comprising traps that have a singular diameter the full distance from the inner surface 74 to the outer surface 76 of the pipe 15. When the buffer chamber assembly 10 is installed on the pipe 15, care is taken to ensure that the taps 72 are aligned with the chamber port 24 so that there is fluid communication between the fluid in the pipe 15 and the chamber 12 of the buffer chamber assembly 10.

Figure 4:
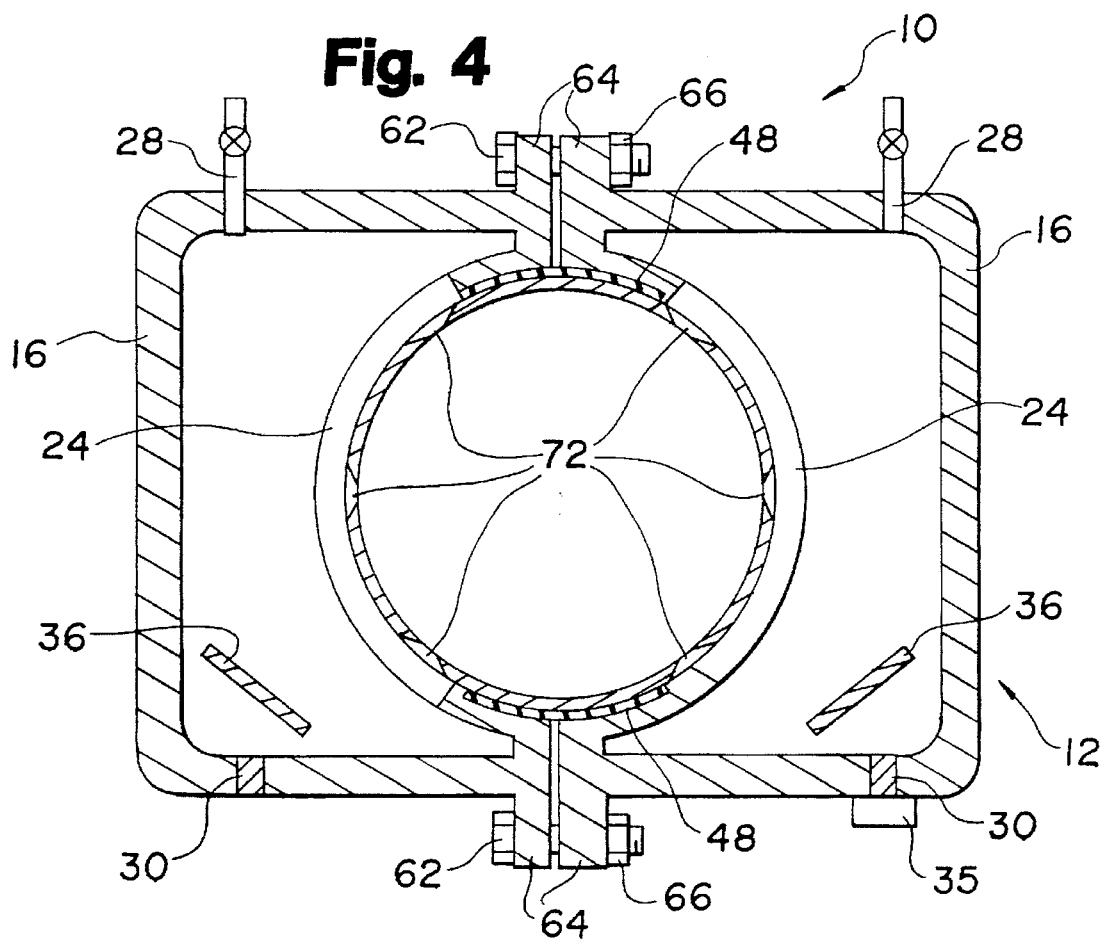
FIG. 4 is a sectional view of a second preferred embodiment of the buffer chamber assembly comprising two chambers.
Figure 7:
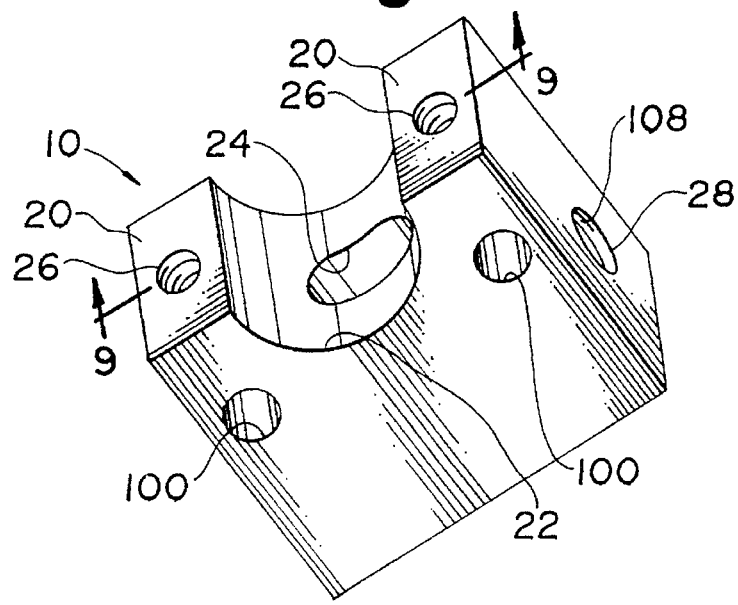
FIG. 7 is a perspective view of a fifth preferred embodiment of the buffer chamber assembly of the present invention.
Figure 8:
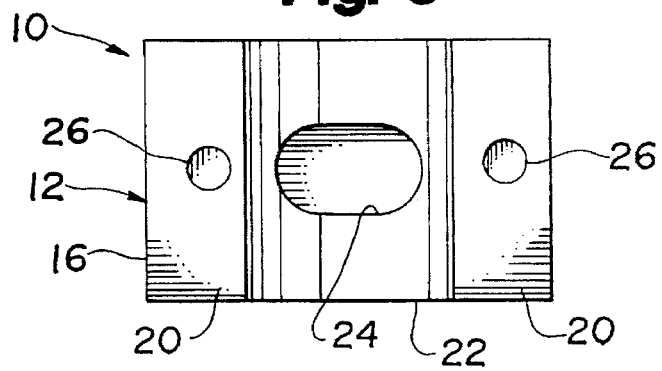
FIG. 8 is an end elevational view of the embodiment of FIG. 7.

FIG. 4 is a second preferred embodiment of the invention. FIG. 4 depicts a buffer chamber assembly 10 comprising two opposed chambers 12. Each of the chambers 12 of the present embodiment is constructed substantially as described above. By using two opposed identical chambers 12, the need for a retaining strap 14 is eliminated. The chambers 12 are joined by bolts 62 which are disposed in the flanges 64 and are secured by nuts 66. A plurality of taps 72 are defined equiangularly around the circumference of the pipe 15.

For the embodiment shown in FIG. 4, the chamber port 24 of each of the chambers 12 is aligned with the pressure taps 72. The chambers 12 are secured by operatively joining bolts 62 and nuts 66.

FIG. 5 is a third preferred embodiment of the invention shown in FIG. 1-3. FIG. 5 shows a buffer chamber assembly 10 which comprises a circular chamber 12. Similar to the embodiment shown in FIG. 4, the flanges 64 are joined by a bolt 62 which is held secure by nuts 66. For the embodiment shown in FIG. 5, the chamber 12 is made to encircle the pipe 15 and is held securely in place by joining the flanges 64. Flanges 64 are joined by operatively connected bolts 62 and nuts 66.

FIG. 6 is a fourth preferred embodiment of the invention shown FIG. 1-3. FIG. 6 shows a buffer chamber assembly 10 with a flushing system 82. The flushing system 82 communicates with the chamber 12 through the injection port 84. The injection port 84 provides a pressure-proof seal between the reservoir 86 and the chamber 12. The reservoir 86 holds the fluid which will be introduced into the buffer chamber assembly 10 by a small pump (not shown). The reservoir 86 is preferably constructed of a material which is impervious to degradation by the fluid contained within the reservoir 86. The pressure bearing capacity of the pump (not shown) must be adequate to allow greater pressurization of the fluid before the valve 88 than that of the fluid within the chamber 12 so that fluid travels from the reservoir 86 to the chamber 12.

For the embodiments shows in FIGS. 1–3 and 6, assembly of the buffer chamber assembly 10 is accomplished by simply aligning the chamber port 24 with the pressure taps 72. The flanges 64 of the retaining strap 14 are then aligned with the threaded holes 26. Bolts 62 are disposed in flanges 64 to secure the threaded holes 26.

FIGS. 7–10 depict a fifth preferred embodiment of the buffer chamber assembly 10 of the present invention. In this embodiment, the chamber body 16 of the chamber 12 is unitary, being formed from a single block of substantially homogeneous material. The material may be a metallic material such as aluminum or stainless steel or it may be a plastic material. The unitary chamber body 16 requires milling or other material removal methods to form the chamber cavity 102 defined therein. By being unitary, this embodiment design eliminates the need for the opposed sides 18 as depicted in previous embodiments.

Figure 9:
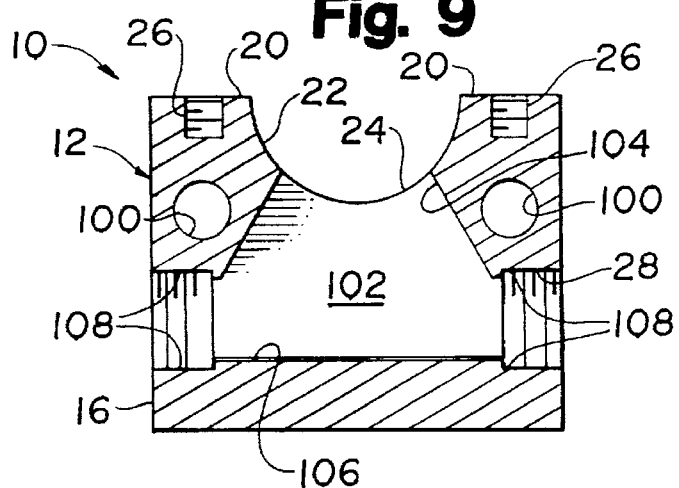
FIG. 9 is a sectional view of the buffer chamber taken along the line 9—9 of FIG. 7.
Figure 10:
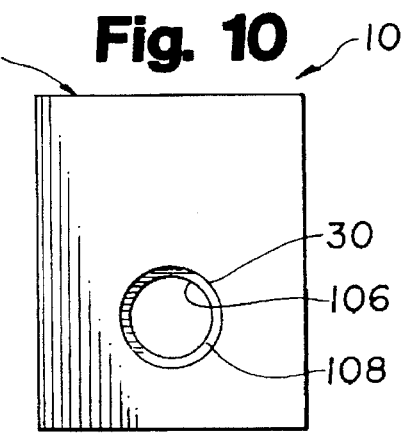
FIG. 10 is a side elevational view of the embodiment of FIG. 7.

The unitary chamber body 16 has a chamber cavity 102 defined therein. The chamber cavity 102 is comprised of two elements, a chamber port interconnect 104 and a chamber bore 106. The chamber port interconnect 104 fluidly couples the chamber port 24 to the chamber bore 106. As indicated in FIG. 9, the chamber port interconnect 104 is trapezoidal in cross section, expanding at the intersection with the chamber bore 106 to increase the volume of the chamber cavity 102.

The chamber bore 106 is a bore defined through the chamber body 16. The longitudinal axis of the chamber bore 106 is transverse to the center axis of the chamber port interconnect 104. The first terminus of the chamber bore 106 defines the valve port 28 and the second terminus of the chamber 106 defines the sensor port 30. Both the valve port 28 and the sensor port 30 have threads 108 defined therein to accommodate the insertion of bushings therein. Further, either the valve port 28 or the sensor port 30 may be plugged by threadingly engaging a suitable plug in the threads 108 thereof in instances where such port 28, 30 is not required for the particular application of the buffer chamber assembly 10.

The buffer chamber assembly 10 depicted in FIGS. 7-10 may be operably coupled to the pipe 15 by using a retaining strap 14 as previously described. Alternatively, pins (not shown) may be inserted through the mounting bores 100 such pins have a length that is greater than the width dimension of the buffer chamber assembly 10 so that the ends of the pins project on either side of the buffer chamber assembly 10. A tightenable strap (not shown) connects the two ends of the pins exposed on a side of the buffer chamber assembly 10 to an end of a similar pin positioned on the far side of the pipe 15. Tightening such strap sealingly couples the buffer chamber assembly 10 to the pipe 15.

In use, the buffer chamber assembly 10 contains a fluid under a pressure that is related to the pressure within the pipe 15. Fluid passes from the pipe through the pressure taps 72. Fluid then passes through the chamber port 24 into the chamber 12. In the chamber 12, a composite or multiphase fluid separates, the denser fluid sinking to the bottom while less dense fluid floating to the top of the chamber 12. The protecting barrier 36 prevents direct travel of fluid from the pressure taps 72 to the sensor port 30. Fluid fills the sensor port 30 and contacts the sensor 35. The sensor 35 measures the pressure in the fluid. When relatively incompressible fluids are carried in the pipe 15 the pressure measurement determined at the sensor 35 accurately represents the pressure in the pipe 15.

The heater 25 shown in FIG. 3 may be used to raise the temperature of the fluid in the chamber 12. By raising the fluid temperature, the viscosity of the fluid is reduced. Similarly, the flushing system 82 shown in FIG. 6 would also result in lower viscosity fluid in the chamber 12. Lower viscosity fluid is less likely to clog the sensor port 30. Accuracy of pressure measurement is improved.

The separation of fluids which occurs in the chamber 12 causes only the fluid of the highest density to enter the sensor port 30 when the sensor port 30 is located downward in relation to the remainder of the chamber 12. Where fluids such as oil and water are transported through the pipe 15, the water is the denser of the two fluids and thus enters the sensor port 30. Water cannot clog the sensor port 30 whereas oil may cause the port 30 to become clogged. Clogging of the sensor port 30 could cause a pressure drop across the clog, thus causing an inaccurate pressure reading by the pressure measuring device 34. The present system, therefore, provides a more reliable means for measuring fluid pressure in a pipe 15.

The taps 72 are counter-sunk so that discontinuities in the fluid, such as solids or gas bubbles, do not become lodged in the taps 72. Discontinuities which are able to pass initially through the relatively smaller diameter of the tap 72 on the inner surface 74 will be small in comparison to the diameter of the taps 72 on the outer surface 76. This disparity in size between the discontinuity and the taps 72 diameter causes a smaller percentage of the surface area of the discontinuity to contact the taps 72 than if the discontinuity and the taps 72 were of similar size. Less contact between the discontinuity and the taps 72 results in less potential for the discontinuity becoming lodged in the taps 72. Another advantage of the counter-sunk taps 72 is evident during initial flow of fluid from the pipe 15 into the semi-filled chamber 12. The fluid passing through the taps 72 expands as it passes from the inner surface 74 to the outer surface 76 through the taps 72. As the fluid expands its pressure drops. That pressure drop motivates any discontinuities partially blocking a given tap 72 to travel with the fluid flow and, therefore, leave the tap 72 and enter the chamber 12. Therefore, in at least two ways the taps 72 result in a lower probability of clogging than if the taps 72 were not counter-sunk. The small diameter of the tap 72 on the inner surface 74 further results in less disturbance of fluid flow through the pipe 15. A disturbance-free flow is desirable to attain separated, laminar flow within the pipe 15.

The function of the taper in the taps 72 is to prevent clogging. Specifically, oil bubbles, for example, which would otherwise clog a pressure line or transducer, will readily pass through the tapered tap 72 having the same sized opening diameter at the interior surface of the pipe wall as a straight bored tap. The angle of taper must provide for an abrupt opening away form the sharp corner of the opening diameter at the interior surface of the pipe wall in order that the bubbles do not accumulate at the opening.

It is understood that a number of modifications can be readily devised in accordance with the principles of the present invention by those skilled in the art without departing from the spirit and scope of the invention. Therefore, it is not desired to restrict the invention to the particular construction illustrated and described, but to cover all modifications that may fall within the scope of the appended claims.

I claim:

1. A buffer chamber apparatus being in flow communication with a multiphase fluid in a pipe and retaining a sample of the fluid in a substantially non flowing condition for presenting the non flowing fluid to a sensor, the fluid having fluid components of differing density, comprising:

a chamber for retaining fluid; a coupling means being operatively coupled to the chamber for retaining the chamber in operative coupling with the pipe;

a chamber port being in flow communication with the fluid in the pipe; and at least one sensor port defined in the chamber for presenting a selected fluid parameter to the sensor for measurement thereby, whereby the fluid components separate by density in the chamber.

2. A buffer chamber apparatus as claimed in claim 1 further including a fluid tap defined in the structure of a pipe for flow communication with the chamber of the buffer chamber apparatus, the pipe having an inside surface defining a flow conduit and an outer surface, the fluid tap being counter-sunk to present a substantially smaller area aperture on the inside surface of the pipe relative to the area of the aperture on the outer surface of the pipe and a tapered surface therebetween.

3. A buffer chamber apparatus as claimed in claim 1 wherein the chamber further includes a fluid port for the selective removal of fluids from the chamber and for the introduction of fluids into the chamber.

4. A buffer chamber apparatus as claimed in claim 3 wherein the fluid port and the sensor port are disposed spaced apart in the chamber, whereby there is an elevational difference between the fluid port and the sensor port when the buffer chamber apparatus is disposed on the pipe, whereby a first fluid component is available at the fluid port and a second fluid component is available at the sensor port.

5. A buffer chamber apparatus as claimed in claim 4 further including a flushing means being in flow communication with the chamber, the flushing means for introducing a flushing material to the fluid resident in the chamber.

6. A buffer chamber apparatus as claimed in claim 5 further including a flushing means having a pump operably coupled thereto, the pump selectively injecting the flushing material into the chamber.

7. A buffer chamber apparatus as claimed in claim 1 wherein the chamber has a generally U-shaped housing presenting a generally semi circular mating face adapted for mating in sealing engagement with the pipe, the mating face having an aperture defined therein, the aperture being in registry with at least one tap defined in the pipe.

8. A buffer chamber apparatus as claimed in claim 7 wherein the chamber has two opposed side panels presenting a margin for sealing engagement with the chamber housing.

9. A buffer chamber apparatus as claimed in claim 8 wherein the side panels further include bolt type fasteners that reside in bores defined in the respective side panels, whereby tightening the fasteners cooperatively sealingly clamps the housing between the two opposed side panels.

10. A buffer chamber apparatus as claimed in claim 7 further including a second chamber having a generally U-shaped housing and presenting a generally semi circular mating face, the second chamber being disposed opposite to the first chamber on the pipe and being operatively coupled to the first chamber.

11. A buffer chamber apparatus as claimed in claim 1 wherein the chamber has a unitary chamber having a chamber cavity defined therein, the chamber port and the at least one sensor port being in fluid communication with the chamber cavity.

12. A buffer chamber apparatus being operably fluidly coupled to a pipe bearing a fluid comprised of components of different densities, comprising:

structure defining a substantially fluid tight chamber being in flow communication with the fluid borne in the pipe;

one or more ports defined in the chamber structure whereby the fluid in the chamber may be selectively accessed for sensing a parameter thereof, whereby the fluid in the chamber resides in a substantially stable state promoting the separation of the different density components of the fluid.

13. A buffer chamber apparatus as claimed in claim 12 wherein the one or more ports are elevationally spaced apart in the chamber structure as to be affected by a selected fluid component.

14. A buffer chamber apparatus as claimed in claim 13 wherein the chamber has a generally U-shaped housing presenting a generally semi circular mating face adapted for mating in sealing engagement with the pipe, the mating face having an aperture defined therein, the aperture being in registry with at least one tap defined in the pipe.

15. A buffer chamber apparatus as claimed in claim 14 wherein the chamber has two opposed side panels presenting a margin for sealing engagement with the chamber housing.

16. A buffer chamber apparatus as claimed in claim 15 wherein the side panels further include bolt type fasteners that reside in bores defined in the respective side panels, whereby tightening the fasteners cooperatively sealingly clamps the housing between the two opposed side panels.

17. A buffer chamber apparatus as claimed in claim 12 wherein the structure defining the substantially fluid tight chamber is formed from a substantially homogeneous component.

18. A buffer chamber apparatus for measuring parameters of a fluid in a pipe, comprising:

a chamber to retain fluid, the chamber having a housing and at least one sensor port defined in the housing;

a clamp for retaining the chamber housing in operative engagement with the pipe;

a gasket for effecting a fluid seal between the chamber housing and the pipe; and a means for measuring fluid parameters, wherein pressure taps defined in the pipe provide a means of communication of fluid between the pipe and the chamber.

19. A buffer chamber apparatus as claimed in claim 18 further including a fluid tap defined in the structure of a pipe for flow communication with the chamber of the buffer chamber apparatus, the pipe having an inside surface defining a flow conduit and an outer surface, the fluid tap being counter-sunk to present a substantially smaller area aperture on the inside surface of the pipe relative to the area of the aperture on the outer surface of the pipe and a tapered surface therebetween.

20. A buffer chamber apparatus as claimed in claim 19 further including a bleed tap being in flow communication with the chamber, for the selective removal or introduction of fluids into the chamber.

21. A buffer chamber apparatus as claimed in claim 20 further including a flushing apparatus being operatively coupled to the bleed tap, the flushing apparatus for injecting a flushing material into the chamber.

22. A buffer chamber apparatus as claimed in claim 18 wherein the means for measuring fluid parameters are a pressure sensor and the fluid parameter measured is the pressure of the fluid.

23. A method of measuring a parameter of a multiphase flow of a fluid having component fluids of differing densities being transported in a pipe, comprising the steps of:

tapping into the pipe to generate a fluid flow therefrom;

stagnating the fluid flow from the pipe in a chamber;

separating the components of the fluid by density in the chamber; and measuring a parameter of a selected component of the separated fluid in the chamber.

24. A method of measuring a parameter of a multiphase flow of a fluid as claimed in claim 23 further including the step of selectively bleeding a component of the separated fluid from the chamber.

25. A method of measuring a parameter of a multiphase flow of a fluid as claimed in claim 24 further including the step of flushing the chamber by injecting a flushing material therein.

* * * * *